United States Patent [19]

Trombe et al.

[11] 4,197,993
[45] Apr. 15, 1980

[54] DWELLINGS EQUIPPED WITH NATURAL AIR CONDITIONING INSTALLATIONS

[75] Inventors: Felix Trombe, Paris; Jacques Michel, Neuilly-sur-Seine, both of France

[73] Assignee: Agence Nationale de Valorisation de la Recherche (ANVAR), Neuilly-sur-Seine, France

[21] Appl. No.: 916,297

[22] Filed: Jun. 16, 1978

Related U.S. Application Data

[62] Division of Ser. No. 735,037, Oct. 22, 1976, Pat. No. 4,111,359.

[30] Foreign Application Priority Data

Oct. 28, 1975 [FR] France ............................... 75 32921
Jun. 30, 1976 [FR] France ............................... 76 19960

[51] Int. Cl.$^2$ ............................................. F24J 3/02
[52] U.S. Cl. ............................ 126/429; 165/48 S; 98/31
[58] Field of Search ............ 126/270; 237/1 A; 98/31; 165/48 S

[56] References Cited

U.S. PATENT DOCUMENTS

| 2,601,905 | 7/1952 | Anderegg | 126/270 X |
| 3,957,109 | 5/1976 | Worthington | 165/48 S |
| 4,128,124 | 12/1978 | Worthington | 165/48 S |

FOREIGN PATENT DOCUMENTS

| 1152129 | 2/1958 | France. |
| 2144066 | 1/1973 | France. |

*Primary Examiner*—William E. Wayner
*Attorney, Agent, or Firm*—Larson, Taylor and Hinds

[57] ABSTRACT

The installation comprises at least one inclined thermal enclosure, forming all or part of the roofing of the dwelling, bounded by an inner roof element, essentially constituted by a collector material of very low thermal mass, absorbing radiation of the solar radiation type of wave length comprised between 0.25 and 4 microns. An outer covering element also of very low thermal mass, is essentially constituted by a material, preferably transparent to solar radiation and behaving as an opaque body to infra-red radiation of wave length comprised between 4 and 30 microns and so capable of emitting this radiation. This outer covering element has water and air sealing properties. This thermal enclosure is connected at its upper part to an upper duct forming a chimney directed upwards and provided with a closure member and, at its lower part, to a lower duct directed downwards and opening into the dwelling through at least one orifice. This thermal enclosure is connected at its upper part to a circulation duct opening into the dwelling and provided with a closure member in the vicinity of its opening.

13 Claims, 14 Drawing Figures

Fig. 8.

DWELLINGS EQUIPPED WITH NATURAL AIR CONDITIONING INSTALLATIONS

This is a division, of application Ser. No. 735,037 filed Oct. 22, 1976, now U.S. Pat. No. 4,111,359.

BACKGROUND OF THE INVENTION

1. Field of the Invention

The invention relates to dwellings equiped with natural air-conditioning in which devices are provided for, on the one hand, trapping radiation of the solar radiation type whose wave length is comprised between 0.25 and 4 microns, and on the other hand, emitting radiation of the infra-red type whose wave length is comprised between 4 and 30 microns.

2. Description of the Prior Art

Figure 1:
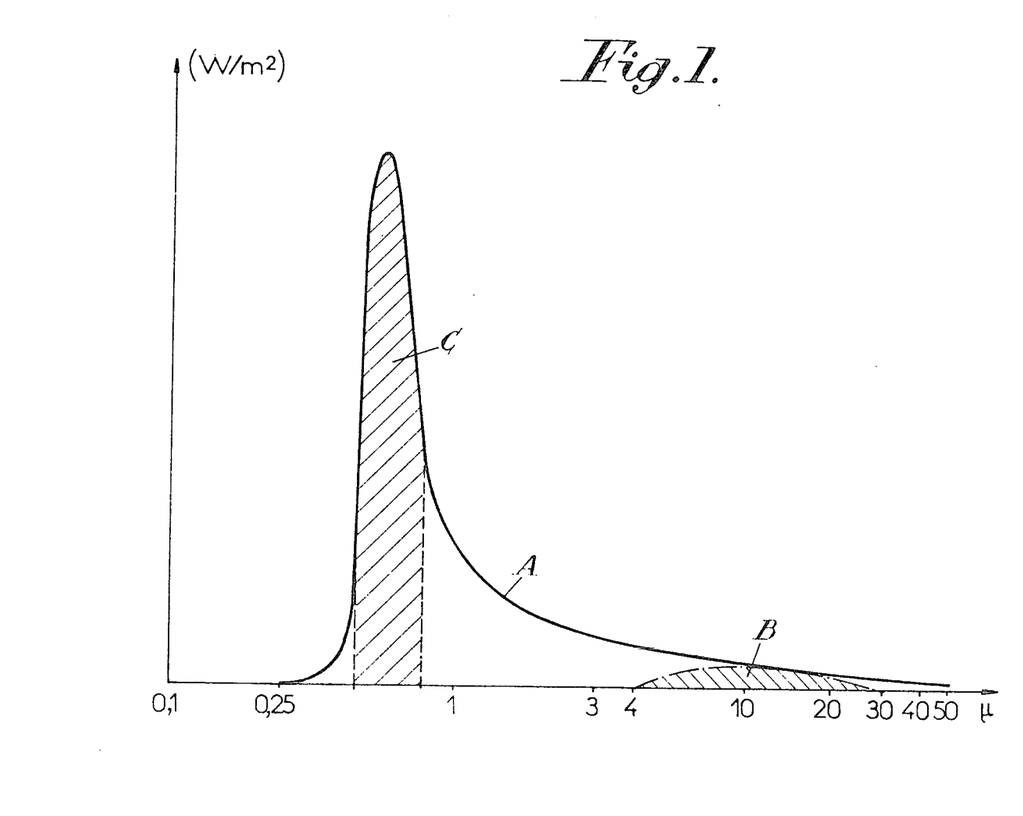
FIG. 1 shows a graph, as mentioned above, of the energy spectrum of the atmosphere.

It is known, in fact, that the energy spectrum of the atmosphere develops as indicated by curve A in FIG. 1 in which the wave length is plotted in abscissa and energy as the ordinate. In addition, the emission of infra-red radiation from terrestrial surfaces considered as black bodies, develops as indicated by the hatched area at B in this FIG. 1. Lastly, in this same FIG. 1, the visible radiation is shown by the hatched area at C.

The area comprised between 0.25 and 4 microns (radiation of the solar radiation type) corresponds to the energy captured and the area comprised between 4 and 30 microns (infra-red radiation) corresponds to the energy emitted: this energy may be emitted due to the characteristics of the atmosphere which has under certain atmospheric conditions, transparency properties (windows of the atmosphere) in these areas of wave length from 4 to 30 microns.

During the period of interception of the solar radiation, it is possible to create a flow of hot air, and during the period of emission of infra-red radiation, it is possible to create a flow of cool air.

In dwellings of this type and more especially arranged for collecting solar radiation, it has been proposed to include one or several thermal enclosures bounded by a frontage element exposed to the solar radiation and by a transparent outer wall designed to be traversed by the solar radiation. The air occupying the dwelling is heated in this enclosure to be subsequently distributed in the dwelling (heating of the dwelling) or directed to the outside (cooling of the dwelling by the creation of an induction of external cool air). Such dwellings are described in French Patent Nos. 1 152 129 filed 1.3.56 and No. 71 23778 filed 29.6.71.

It has been observed, however, that the arrangement of the thermal enclosure along a frontage element presents a certain number of drawbacks among which may be mentioned two, enumerated below:

the impossibility of obtaining an emission of infra-red radiation to the atmosphere in sufficient proportions to obtain a cooling effect, incompatibility of certain styles of architecture, notably detached houses (low, enveloping roofings and forming canopies), incompatibility with certain types of buildings (industrial premises of large ground surface area having unsunlit facades and considerable areas of roofing), difficulty of location in towns (facades hidden from sunlight by neighboring buildings).

OBJECTS AND GENERAL DESCRIPTION OF THE INVENTION

It is a principal object of the present invention to overcome the aforesaid drawbacks.

It is also an object of the present invention to provide a dwelling in which it is possible to trap or to emit radiation, by means of the low thermal mass of an inner roof element and of an outer covering element, to obtain a lowering of the temperature very rapidly.

It is also an object of the invention to provide a dwelling in which the effect of increase in temperature is only noticed when the sun is already high, which enables the cooling effect to be prolonged for several hours after sunrise.

It is a further object of the invention to provide a dwelling adaptable to any architectural style, to any type of building and to any type of location.

Another object of the invention is to provide a dwelling which is more particularly advantageous in hot countries due to the "cooling" aspect of the air conditioning.

Other objects and advantages of the invention will emerge from the description which follows.

According to the invention there is provided a dwelling equiped with an air conditioning installation comprising at least one inclined thermal enclosure forming all or part of the roofing of the dwelling, and it is characterised by the fact that this thermal enclosure is bounded by an inside roof element, essentially constituted by a trapping material of very low thermal mass abosrbing radiation of the solar radiation type of wave length comprised between 0.25 and 4 microns, and an outer covering element, also of very low thermal mass, essentially constituted by a material preferably transparent to solar radiation and behaving as an opaque body to infra-red radiation of wave length comprised between 4 and 30 microns and, through this fact, capable of emitting this radiation, said outer covering element having water and air sealing properties, by the fact that this thermal enclosure is connected, at its upper part, to an upper duct forming a chimney, directed upwards and provided with a closure member, and at its lower part, to a lower duct directed downwards and opening into the dwelling preferably through two orifices respectively at the top part of the dwelling (top orifice) and at the bottom part of the dwelling (bottom orifice), and by the fact that this thermal enclosure is connected, at its upper part, to a circulation duct opening into the dwelling and provided with a closure member in the vicinity of its opening.

Preferably, the upper duct forming a chimney is constituted by a material of very low thermal mass having capturing properties, for radiation of wave length comprised between 0.25 and 4 microns (solar radiation) and emitting properties suitable for radiation of wave lengths comprised between 4 and 30 microns (infra-red radiation).

In a preferred embodiment of the invention, a thermal storage device is arranged in the path of the circulation duct and a recycling duct, provided with an isolating closure member, is provided to connect this storage device to the lower part of the thermal enclosure; another isolating closure member may be arranged in the circulation duct to isolate the storage device from the thermal enclosure.

Preferably, a blower is provided in the circulating duct in the vicinity of its outlet.

The thermal storage device may be, in addition, arranged so as to be served by the lower duct, so as to be able to store cold when said lower duct is traversed by cold air coming from the thermal enclosure.

In any case, the calorie and/or frigorie storage device may be arranged above or below the habitable part of the dwelling.

In a second embodiment of the invention, the dwelling is equiped with at least two inclined thermal enclosures forming all or part of the roofing of the dwelling and it is characterised by the fact that, one of the two thermal enclosures, called "hot enclosure", is oriented on the side exposed to the sun and is bounded by an inner wall element, essentially constituted by a material of very low thermal mass capturing radiation of the solar radiation type of wave length comprised between 0.25 and 4 microns, and an outer covering element, transparent or not transparent, having water and air sealing properties, this hot thermal enclosure being connected at its upper part to an upper duct forming a chimney, directed upwards, and provided with a closure member, and to a circulating duct opening into the dwelling and, preferably, provided with a closure member in the vicinity of its outlet, and at its lower part, to a lower duct directed downwards and opening into the dwelling through at least one orifice, the other thermal enclosure, called "cold enclosure", is oriented on the side not exposed to the sun and is bounded by an inner wall element and an outer covering element essentially constituted by an emittor material, of very low thermal mass, behaving like a body opaque to the solar radiation, possibly reflecting solar radiation, and emitting infrared radiation, of wave length comprised between 4 and 30 microns, said outer covering element having water and air sealing properties, this cold thermal enclosure being connected at its upper part, to a circulating duct opening into the dwelling and provided with a closure member in the vicinity of its outlet and, at its lower part, to a lower duct directed downwards and opening into the dwelling through at least one orifice.

Due to the separation between the collecting part and the emitting part, it is possible to pass rapidly from the period of heating-ventilation (circulation in the hot enclosure) to the cooling period (circulation in the cold enclosure).

However, it is possible to select, notably as a function of latitude, the best conditions of orientation and inclination for the inner wall element of the hot enclosure.

In general, it is possible to select, notably as a function of latitude, an orientation and an inclination, on the one hand, of the inner wall element and of the outer covering element of the hot enclosure, and on the other hand, of the outer covering element of the cold enclosure, to obtain maximum efficiency of the heating action and of the cooling action.

It should also be pointed out, due to the separation between the collecting part and the emitting part, it is possible to adopt, for surfaces constituting the inner wall element and the outer covering element of the hot enclosure and the surfaces constituting the outer covering element of the cold enclosure, materials or coverings having the best optical properties.

Thus the surface of the inner wall element of the hot enclosure may be hot selective, trapping the solar radiation and emitting little infra-red radiation, and the surface of the outer covering element of the hot enclosure can be reflecting to infra-red radiation.

Such a heat selective surface may be constituted by stainless steel oxidised by heating from 300° to 500° C.

Thus also the surface of the outer covering element of the cold enclosure may be cold selective, reflecting solar radiation and emitting infra-red radiation like a black body.

Such a cold selective surface may be constituted by aluminum coated by a layer of hydrated alumina by anodic oxidation, or by white paint with finely divided pigment dispersed in a conventional binder (titanium oxide).

BRIEF DESCRIPTION OF THE DRAWINGS

The invention will, in any case, be well understood by means of the additional description which follows as well as the accompanying drawings, which description and drawings relate to a preferred embodiment of the invention as well as to various methods of applying it and do not constitute, of course, any limitation thereof.

In the drawings.

DESCRIPTION OF PREFERRED EMBODIMENTS

Figures 2, 3, 3A:
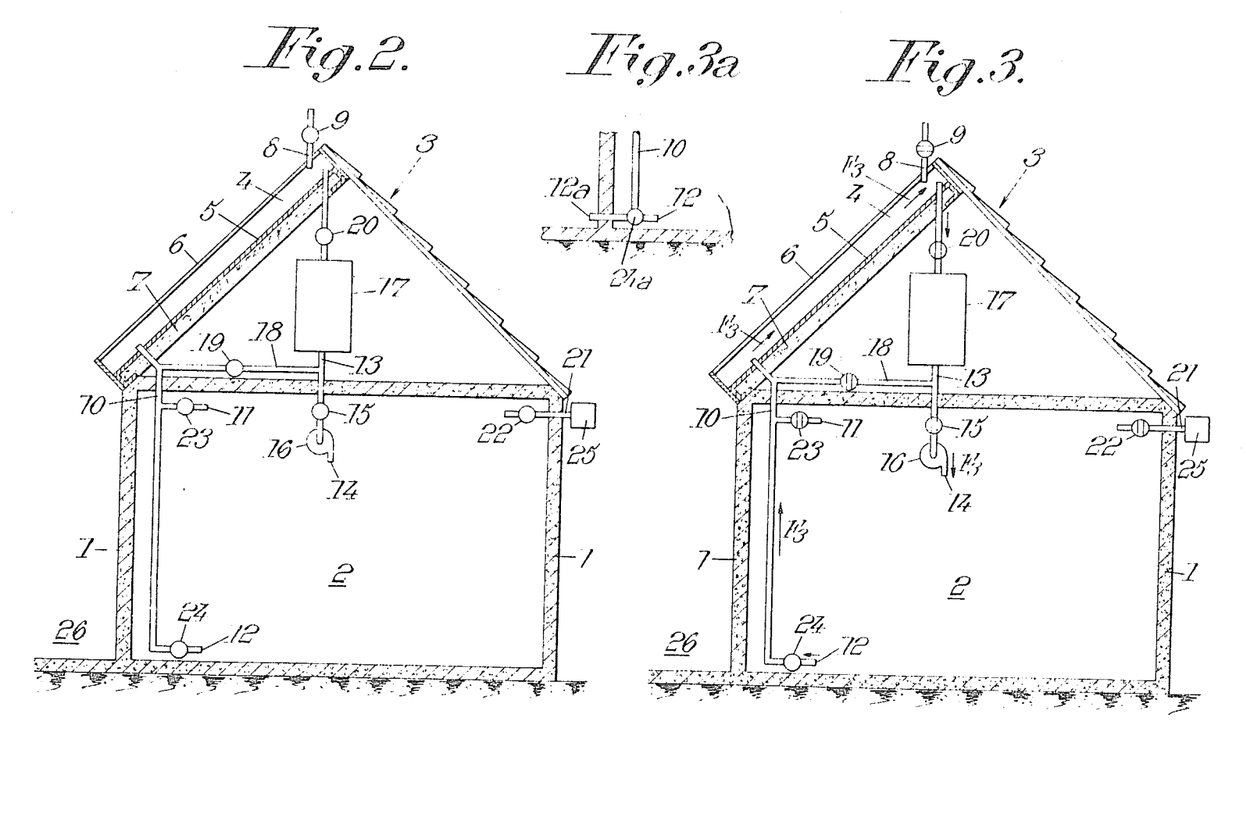
FIG. 2 shows a diagrammatic view of one embodiment of a dwelling constructed according to the invention.
FIG. 3 shows the embodiment of FIG. 2, operating according to a first mode of operation.
FIG. 3a shows a modification of the mode of operation shown in FIG. 3.
Figure 8:
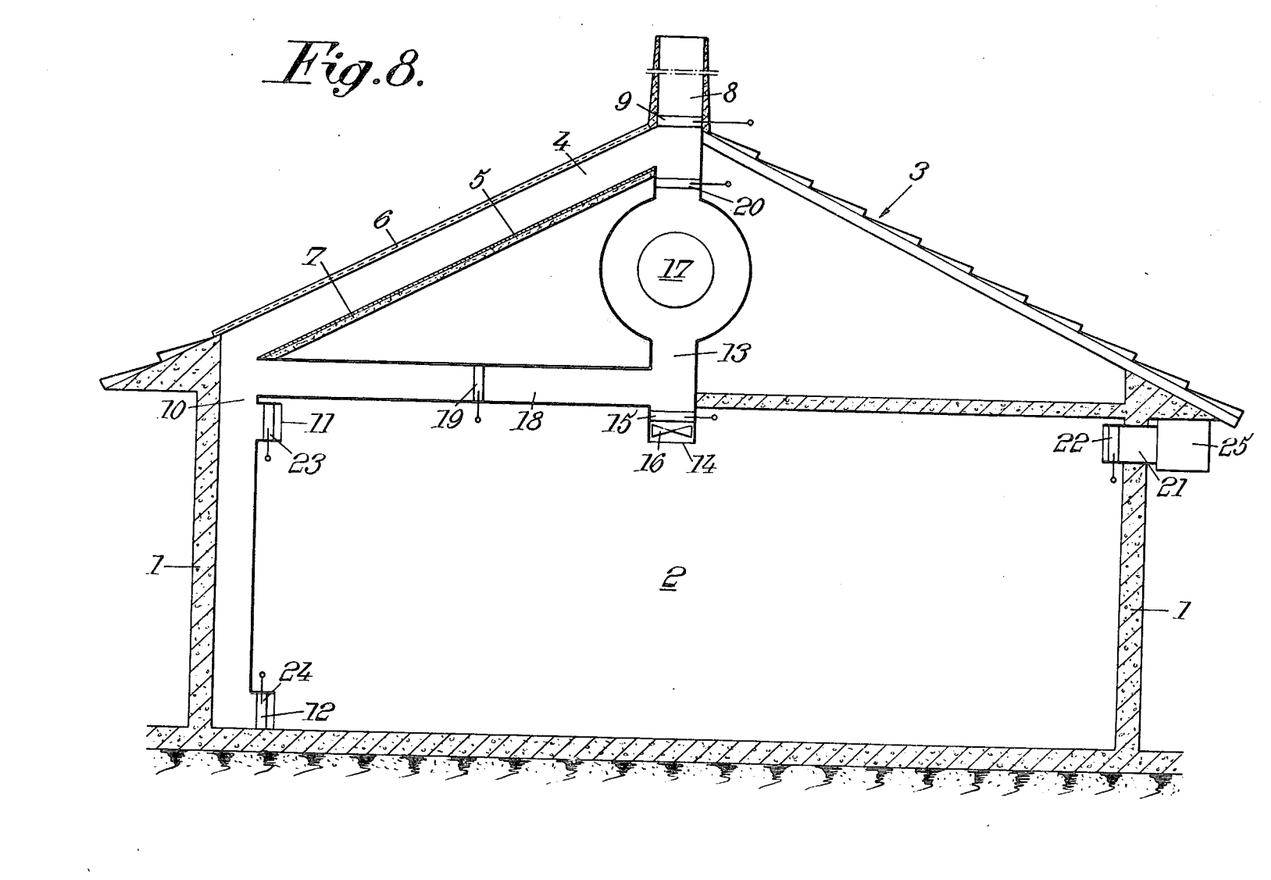
FIG. 8 shows another embodiment of a dwelling such as that shown diagrammatically in FIG. 2.

The dwelling shown in FIG. 2 (diagrammatic view) and in FIG. 8 (example of contruction) comprises walls 1, a part or an assembly of parts 2, and a roofing denoted generally by the reference numeral 3.

The air conditioning installation equiping this dwelling comprises a thermal enclosure 4, inclined, forming a part of the roofing 3 of the dwelling, which part is exposed to the solar radiation of the hemisphere concerned.

This thermal enclosure 4 is bounded by: an inner roof element 5 essentially constituted by a collector material of very low thermal mass absorbing radiation of the solar radiation type of wave length comprised between 0.25 and 4 microns, and an outer covering element 6 also of very low thermal mass, essentially constitued by a material transparent to solar radiation and behaving like an opaque body for infra-red radiation of wave length comprised between 4 and 30 microns and, through this fact, capable of emitting this radiation, said outer covering element having properties of fluid-tightness to water and to air.

The inner roof element 5 is advantageously lined, on the inside of the dwelling, by a layer of insulating material 7. This inner roof element 5 may be constituted by sheet metal which holds the insulating material 7, for example, by totally or partially enveloping it.

As for the outer covering element 6, it may be constituted by toughened glass, selective glass or plastics materials.

This thermal enclosure 4 is connected, at its upper part, to an upper duct 8, forming a chimney, provided with an outlet closure member 9 and directed upwards, and, at its lower part, to a lower duct 10 directed downwards and opening into the dwelling through two orifices, namely an upper orifice 11, situated at the top part of the dwelling, and a lower orifice 12, situated at the bottom part of the dwelling.

This upper duct 8 is advantageously constituted by a material of very low thermal mass having collecting properties for radiation of wave length comprised between 0.25 and 4 microns (solar radiation) and properties of emission suitable for radiation of wave length comprised between 4 and 30 microns (infra-red radiation).

This thermal enclosure 4 is also connected, at its upper part, to a circulation duct 13, opening into the dwelling through an inlet orifice 14, said circulation duct 13 being provided with an inlet closure member 15 located in the vicinity of the inlet orifice 14.

Preferably, a blower 16 is provided in the circulation duct 13, this blower 16 being locatable at the level of the inlet orifice 14 and, possibly, combined with the inlet closure member 15 proper.

A thermal storage device 17 is advantageously positioned in the path of the circulation duct 15, and a recycling duct 18, provided with an isolating closure member 19, is provided to connect this storage device 17 to the lower part of the thermal enclosure.

Another obturating closure member 20 can then be placed in the circulating duct 13 to isolate the storage device 17 from the upper part of the thermal enclosure 4.

An auxilliary duct 21, provided with a closure member 22 can be arranged in one of the walls of one of the dwellings not exposed to solar radiation to enable an intake of cool air; this auxiliary duct 21 is preferably arranged in the top part of the dwelling.

The installation may, in addition, be completed by including, at each of the top 11 and bottom 12 orifices of the lower duct 10, a closure member, respectively 23 and 24.

From the constructional point of view, and as shown clearly in FIG. 8, the various ducts are of wide dimensions and the various closure members are arranged to be opened widely, which permits a natural or forced air circulation to be obtained with a minimum pressure drop.

To obtain direct solar heating, during the interception of the solar radiation by the inner roof element 5, the mode of operation is then as follows.

The outlet closure member 9 is closed.

The isolating closure member 20 is open and the isolating closure member 19 is closed.

The inlet closure member 15 is open, the blower 16 then being actuable.

The closure member 24 of the bottom orifice 12 is open.

The closure member 23 of the top orifice 11 is closed as well as the closure member 22 of the auxiliary duct 21.

This mode of operation is illustrated in FIG. 3, in which the arrows $F_3$ show an air circulation, the reference numerals of this FIG. 3 corresponding to those of FIG. 2.

If, as shown in FIG. 3a, a complementary orifice 12a opening to the outside is included in the lower duct 10 and a three-way closure member 24a serving the orifices 12 and 12a is provided therein, it is possible to take in cool air on the outside to obtain in this way a change of air in the room or group of rooms 2.

Figures 4, 5, 5A:
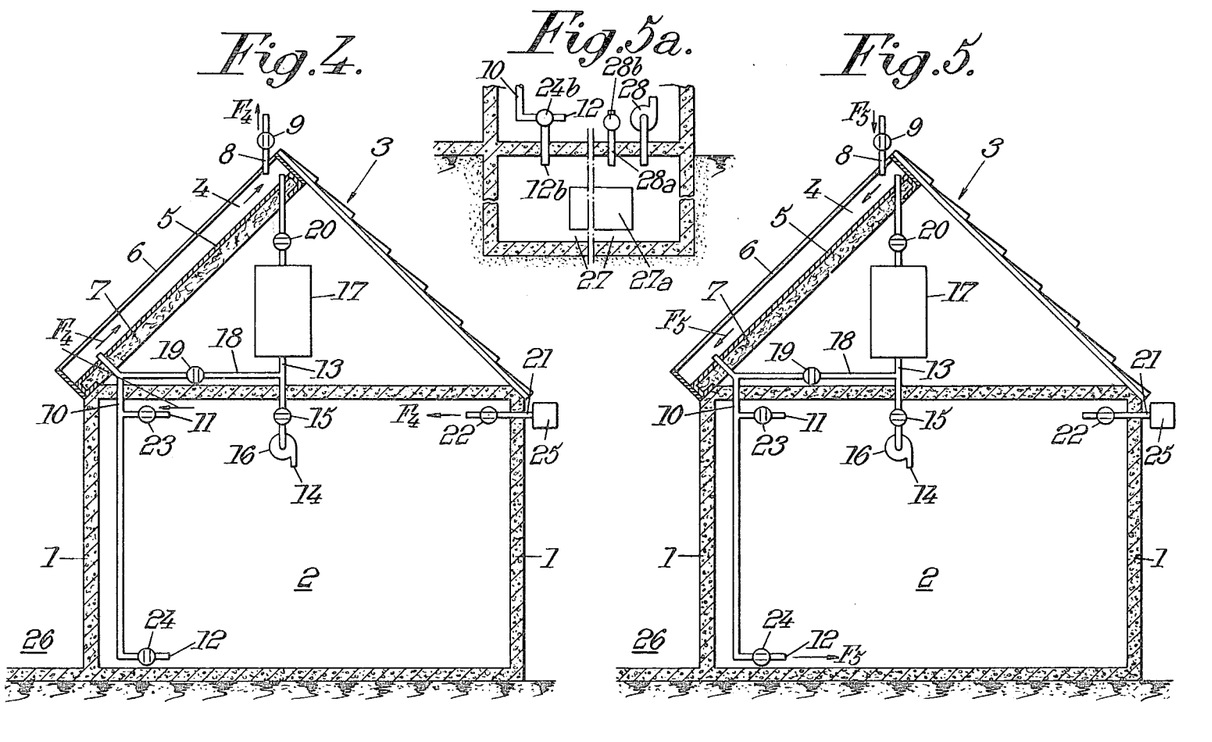
FIG. 4 shows the embodiment of FIG. 2 operating in a second mode of operation.
FIG. 5 shows the dwelling of FIG. 2 operating according to a third mode of operation.
FIG. 5a illustrates a modification of the mode of operation as shown in FIG. 5.

To produce diurnal cooling, during the interception of solar radiation by the inner roof element 5, the mode of operation is as follows.

The outlet closure member 9 is open.

The isolating closure members 20 and 19 are closed.

The inlet closure member 15 is closed, the blower being hence able to be put out of operation.

The closure member 24 of the bottom orifice 12 is closed.

The closure member 23 of the top orifice 11 is open.

The closure member 22 of the auxiliary duct 21 is open.

This mode of operation is illustrated in FIG. 4 in which the arrows $F_4$ show the air circulation, the reference numerals of this FIG. 4 corresponding to those of FIG. 2.

To obtain nocturnal cooling during the emission of infra-red radiation by the outer covering element 6, the mode of operation is as follows.

The outlet closure member 9 is open.

The isolating closure members 20 and 19 are closed.

The inlet closure member 15 is closed and the blower can hence be out of operation.

The closure member 24 of the bottom orifice 12 is open.

The closure member 23 of the top orifice 11 is closed.

The closure member 22 of the auxiliary duct 21 is open to permit the circulation of air.

This mode of operation is illustrated in FIG. 5 in which the arrows $F_5$ show the air circulation, the reference numerals of this FIG. 5 corresponding to those of FIG. 2.

In operating by this method, benefit is derived from the cooling effect due to the emission of the infra-red radiation from the chimney 8 and from the outer covering element 6.

If, as shown in FIG. 5a, an additional orifice 12b opening into a basement 27, and a three-way closure member 24b serving the orifices 12 and 12b are provided in in the lower duct 10, it is possible to store cold in said basement 27. To this end, said basement 27 can include a storage device 27a. An extractor device 28 can then be provided to draw cool air from this basement 27. Arranged in parallel, a communicating duct 28a provided with a closure member 28b can be provided.

Figure 6:
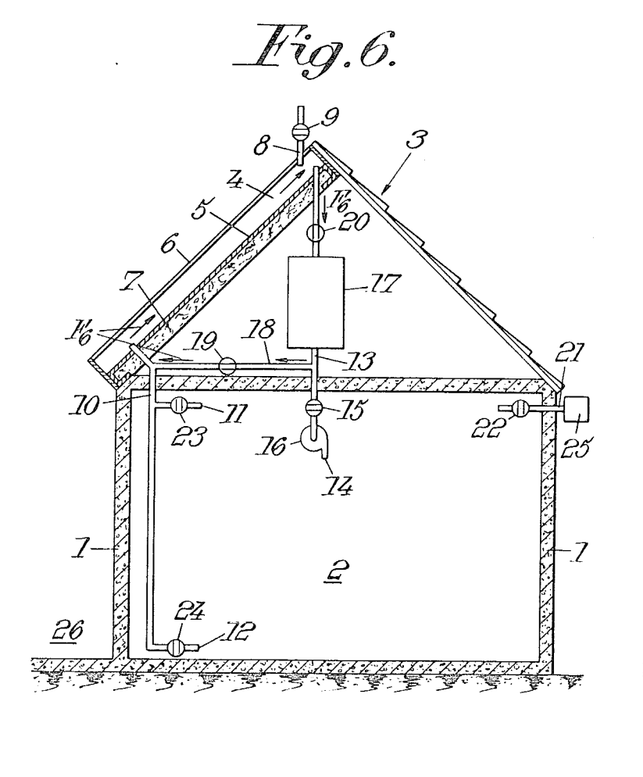
FIG. 6 shows the dwelling of FIG. 2 operating according to a fourth mode of operation.

To produce an accumulation of heat during the interception of solar radiation by the inner roof element 5, the mode of operation is as follows.

The outlet closure member 9 is closed.

The isolating closure members 20 and 19 are opened.

The inlet closure member 15 is closed and the blower can hence be out of operation.

The closure members 24 and 23, of the bottom 12 and top 11 orifices respectively, are closed.

The closure member 22 of the auxiliary duct 21 is closed.

This mode of operation is illustrated in FIG. 6, in which the arrows $F_6$ show the air circulation, the reference numerals of this FIG. 6 corresponding to those of FIG. 2.

Figure 7:
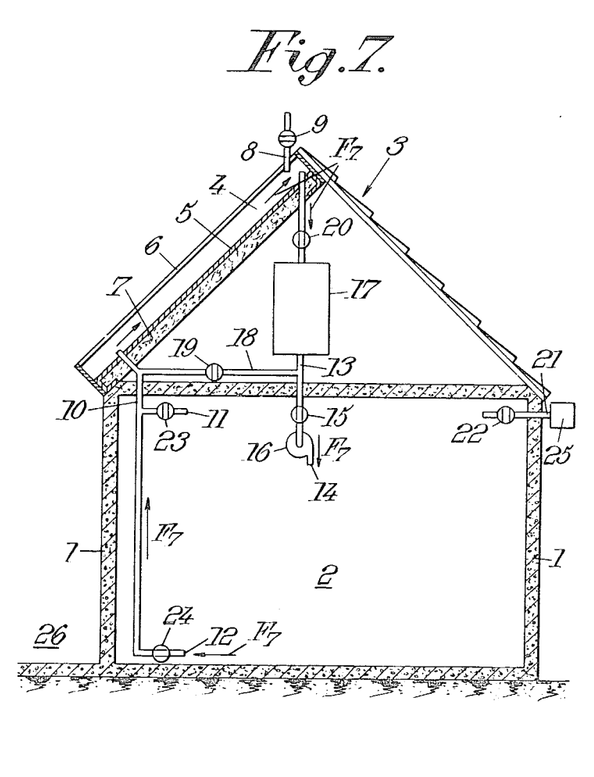
FIG. 7 shows the dwelling of FIG. 2 operating according to a fifth mode of operation.

To obtain an extraction of calories independantly of the period of interception or of emission from the accumulator device 17, the mode of operation is as follows.

The outlet closure member 9 is closed.

The isolating closure member 20 is open and the isolating closure member 19 is closed.

The inlet closure member 15 is open and the blower 16 is put into operation.

The closure member 24 of the bottom orifice 12 is open whilst the closure member 23 of the top orifice 11 is closed.

The closure member 22 of the auxiliary duct 21 is closed.

This mode of operation is illustrated in FIG. 7 in which the arrows $F_7$ show the air circulation, the reference numerals of this FIG. 7 corresponding to those of FIG. 2.

It is advantageous to provide, at the inlet of the auxiliary duct 21, a humidifier device 25 which enables the air-conditioning by diurnal cooling to be further improved. It would also be advantageous to place another humidifier device (not shown) at the level of the top orifice 11, which would permit the air-conditioning by nocturnal cooling to be further improved.

Lastly, the dwelling may be completed by a patio 26 situated on the side of the thermal enclosure 4, this patio receiving during the night (that is to say during the periods of emission of radiation), cold air, falling by gravity, after having flowed over the outer covering elements 6 of the thermal enclosure 4.

Figure 9:
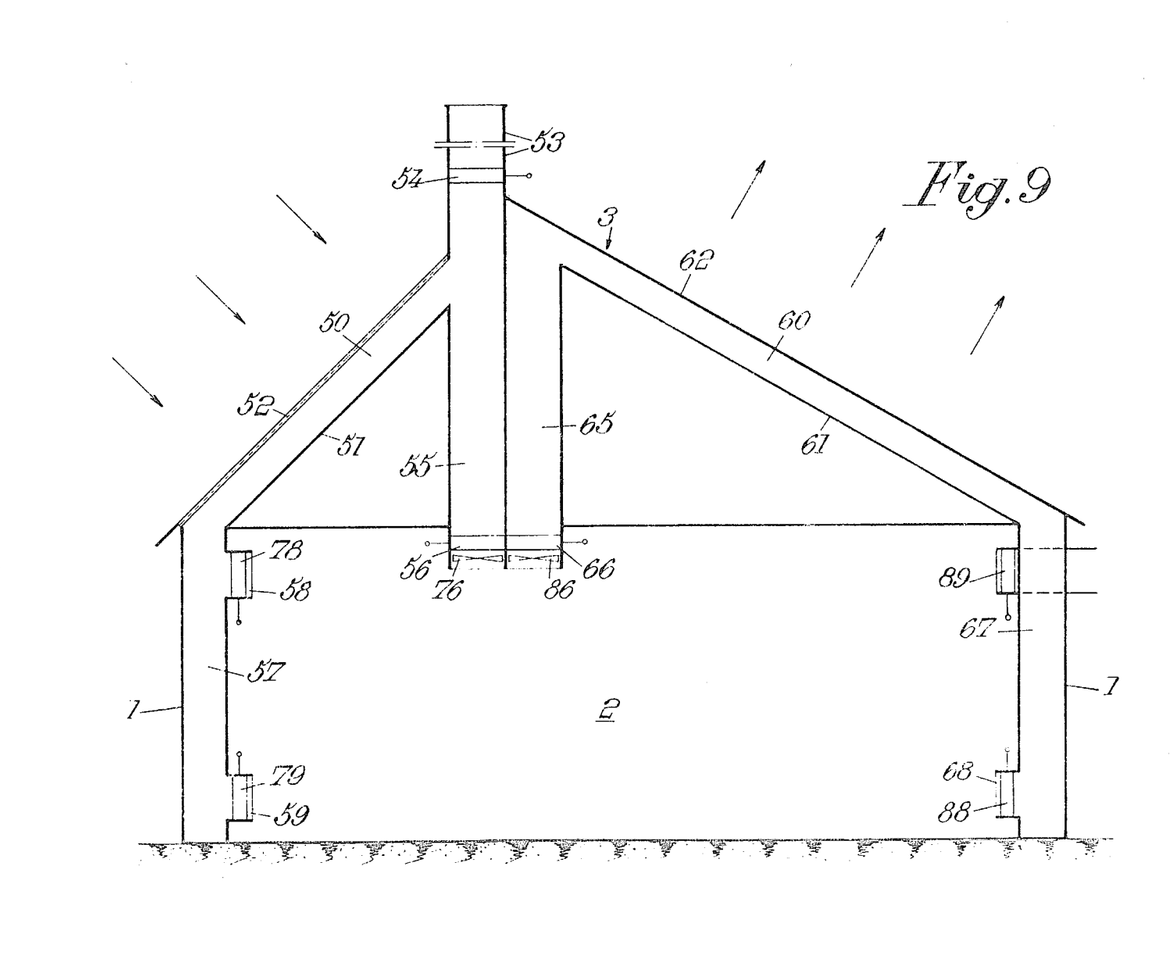
FIGS. 9, 9a, 9b, and 9c show an embodiment of a dwelling constructed according to a second feature of the invention.

The dwelling shown in FIG. 9 includes walls 1, a room or a group of rooms 2, and roofing denoted, generally by the reference numeral 3.

The dwelling includes two thermal enclosures 50 and 60 forming the roofing 3 of the dwelling.

The hot thermal enclosure 50 is oriented on the side exposed to the sun and it is bounded by an inner wall element 51, thermally insulated from the dwelling, and essentially constituted by a collecting material of very low mass, trapping radiation of the solar radiation type of wave length comprised between 0.25 and 4 microns and an outer covering element 52 having water and air sealing properties.

This outer covering element 52 may be transparent or non-transparent to solar radiation.

This hot thermal enclosure 50 is connected, at its upper part, to an upper duct 53 forming a chimney, directed upwards, and provided with a closure member 54, and to a circulating duct 55 opening into the dwelling and provided with a closure member 56 in the vicinity of its opening.

This hot thermaL enclosure 50 is connected, at its lower part, to a lower duct 57, directed downwards and opening into the dwelling through two orifices 58 and 59.

One of these orifices, the orifice 58, is situated at the top part of the dwelling, and preferably, it is provided with a closure member 78.

The other orifice, the orifice 59, is situated at the bottom part of the dwelling and preferably it is provided with a closure member 79.

The upper duct 53 is advantageously constituted by a material of very low, thermal mass having intercepting properties for the solar radiation of wave length comprised between 0.25 and 4 microns.

The cold thermal enclosure 60 is oriented on the side not exposed to the sunlight and it is bounded by an inner wall element 61, thermally insulated from the dwelling, and an outer covering element 62 essentially constituted by an emitter material, of very low thermal mass, and behaving like an opaque body emitting infra-red radiation, of wave length comprised between 4 and 30 microns, said outer covering element 62 having water and air sealing properties.

This cold thermal enclosure 60 is connected, at its upper part, to a circulating duct 65 opening into the dwelling and provided with a closure member 66 in the vicinity of its opening.

This cold thermal enclosure 60 is connected at its lower part, to a lower duct 67 directed downwardly and opening into the dwelling through at least one orifice 68.

This orifice 68 is advantageously situated at the lower part of the dwelling, and preferably, it is provided with a closure member 88.

To encourage the air circulation in the hot enclosure 50 and/or in the cold enclosure 60, it may be advantageous to provide ventilating means.

Thus there is provided, in the circulating duct 55 and preferably in the vicinity of its opening into the dwelling, a blower 76 which may be possibly combined with the closure member 56, and in the circulating duct 65, and preferably in the vicinity of its opening into the dwelling, a blower 86 which can if necessary be combined with the closure member 66.

An airlet 89 is provided on a side of the dwelling not exposed to the sun.

From the constructional point of view, and as shown clearly in the Figure, the various ducts are of wide dimensions, and the various closure members are arranged to open widely, which enables a natural or forced air circulation to be produced with a minimum of pressure drops.

To obtain good efficiency in interception and emission, it may be advantageous, for certain latitudes, to give the inner wall element of the hot enclosure 50 an inclination (with respect to the horizontal) greater than the inclination of the outer covering element 62 of the cold enclosure 60.

For example, and for a latitude comprised between 40° and 50°, the inclination of the inner wall element 51 may be about 45°, and the inclination of the outer covering element 52 must not exceed 30°.

Figure 9A:
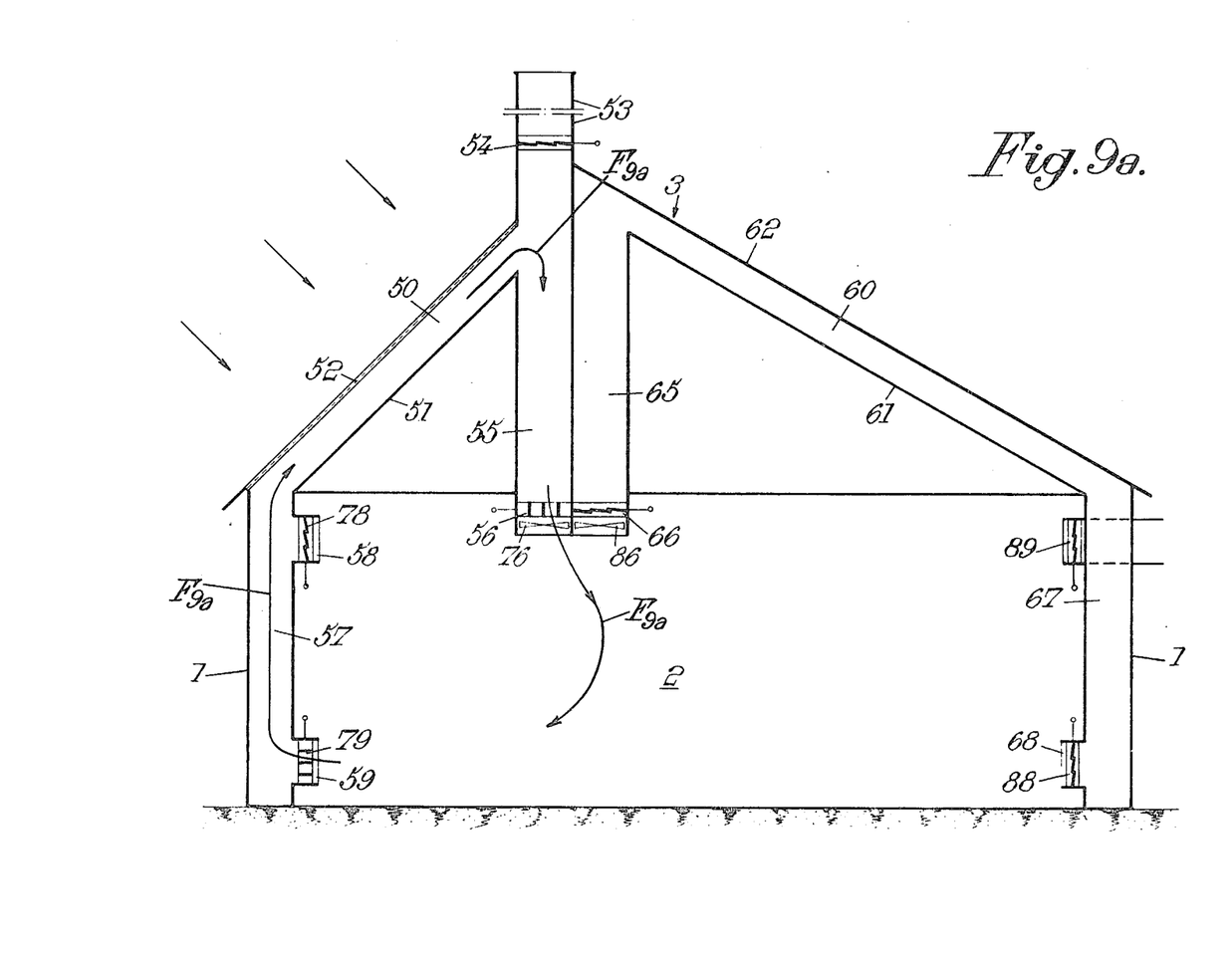

To obtain direct solar heating, during the interception of solar radiation by the inner wall element 51 of the hot enclosure 50, the operation of the installation is as follows (See FIG. 9a).

The air inlet 89 is closed.

The closure members 66 and 88 serving the cold enclosure 60 are closed.

The closure member 54 is closed.

The closed member 56 is open, the blower 76 being actuable.

The closure member 79 of the bottom orifice 59 is open.

The closure member 78 of the top orifice 58 is closed.

The hot air circulates according to the arrows $F\ 9_a$.

Figure 9B:
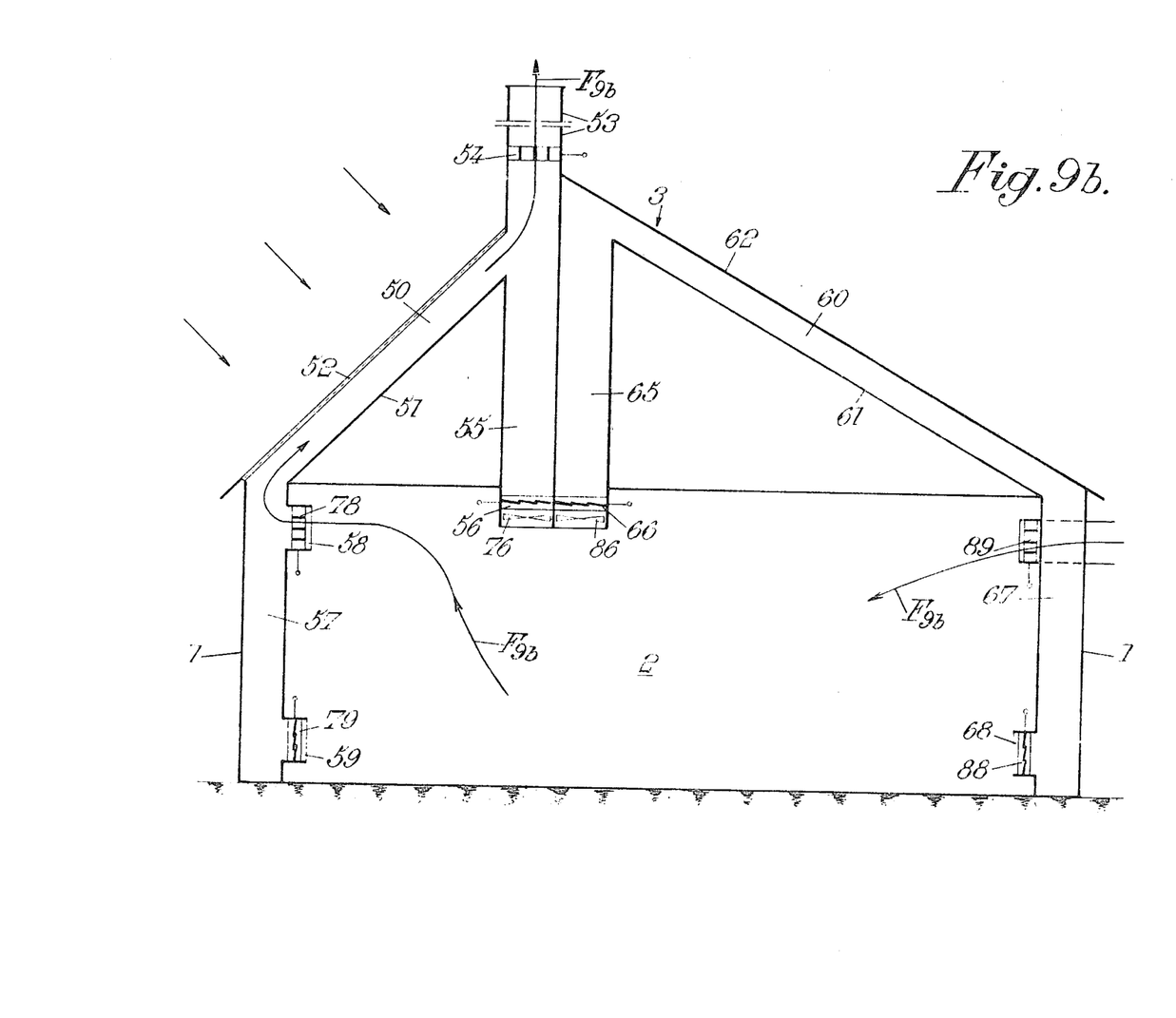

To obtain diurnal cooling, during the interception of the solar radiation by the inner wall element 51 of the hot thermal enclosure 50, the operation of the installation is as follows (See FIG. 9b).

The closure members 66 and 88 serving the cold enclosure 60 are closed.

The closure member 54 is open.

The closure member 56 is closed, the blower 76 being placed out of operation.

The closure member 79 of the bottom orifice 59 is closed.

The closure member 78 of the top orifice 58 is open.

The air inlet 89 is opened.

The cold air circulates according the arrows $F\ 9_b$.

Figure 9C:
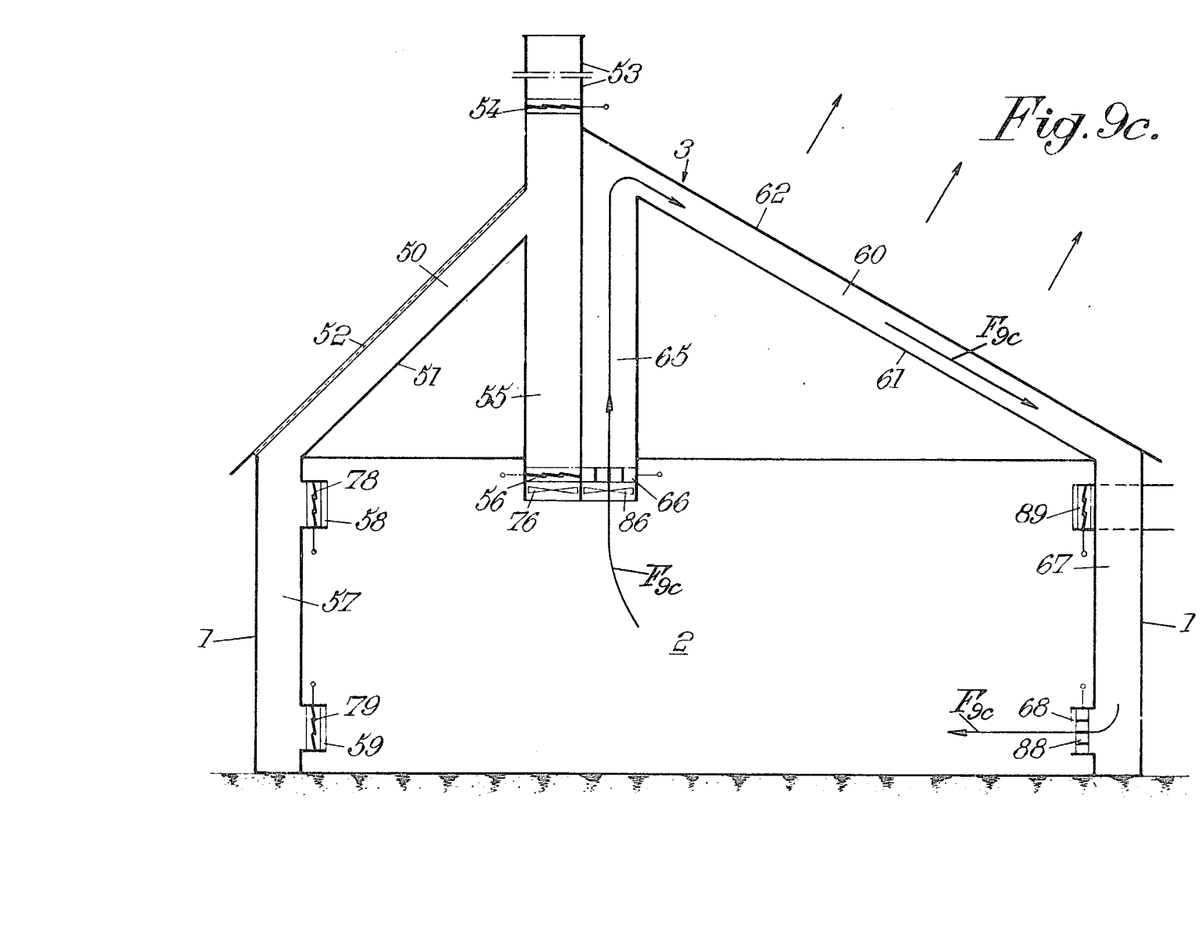

To obtain nocturnal cooling, by the emission of infrared radiation from the outer covering element 62 of the cold enclosure 60, the operation of the installation is as follows (See FIG. 9c).

The air inlet 89 is closed

The closure members 54, 56, 78 and 79 serving the hot enclosure 50 are closed.

The closure member 66 is opened, the blower 86 being actuable.

The closure member 88 is opened.

The cold air circulates according to the arrows $F\ 9_c$.

Of course, and as indicated in the foregoing with respect to FIGS. 1 to 8, it is possible to provide a thermal storage device (not shown in this FIG. 9) to accumulate calories and/or frigories according as it is served by hot air coming from the hot thermal enclosure or cold air coming from the cold thermal enclosure.

It will be apparent that various modifications may be made in the embodiments which have been described without departing from the scope of the invention as defined by the appended claims.

We claim:

1. Dwelling equipped with an airconditioning installation including at least two inclined thermal enclosures forming at least part of the dwelling roofing, comprising:

a first thermal enclosures (hot thermal enclosure) oriented on the side exposed to the sun, an inner wall element, essentially constituted by a material of very low thermal mass, absorbing radiation of the solar radiation type, of wavelength comprised between 0.25 and 4 microns, bounding said hot thermal enclosure internally; and an outer covering element, having sealing properties to water and to air, bounding said hot thermal enclosure externally; an upper duct forming a chimney directed upwards and provided with a closure member, connected to the upper part of said hot thermal enclosure; and a circulation duct opening into the dwelling connected at its upper part to said hot thermal enclosure, and at its lower part connected to a lower duct directed downwards and opening into the dwelling through at least one orifice;

and a second thermal enclosure (cold enclosure) oriented on the side not exposed to the sun; an inner wall element bounding said cold thermal enclosure internally; and an outer covering element essentially constituted by an emittor material of very low thermal mass, behaving like an opaque body to solar radiation, emitting infrared radiation of wavelength comprised between 4 and 30 microns, said outer covering element bounding said cold thermal enclosure externally and having sealing properties to water and to air, a circulation duct connected at its upper part to said cold thermal enclosure and opening into the dwelling and provided with a closure member in the vicinity of its opening; and a lower duct directed downwards and opening into the dwelling through at least one orifice and connected to the lower part of said cold thermal enclosure.

2. Dwelling according to claim 1, wherein the circulation duct connecting the upper part of the hot enclosure to the dwelling is provided with a closure member in the vicinity of its opening into the dwelling.

3. Dwelling according to claim 1, wherein the surface of the inner wall element of the hot enclosure is a hot selective surface capturing the solar radiation and emitting little infra-red radiation.

4. Dwelling according to claim 3, wherein the hot selective surface is constituted by stainless steel oxidised by heating.

5. Dwelling according to claim 1, wherein the surface of the outer covering element of the hot enclosure has infra-red radiation reflection properties.

6. Dwelling according to claim 1, wherein the surface of the outer covering element of the cold enclosure is a cold selective surface reflecting solar radiation and emitting infrared radiation like a black body.

7. Dwelling according to claim 6, wherein the cold selective surface is constituted by aluminum coated with a layer of alumina hydrated by anodic oxidation.

8. Dwelling according to claim 5, wherein the cold selective surface is constituted by white paint with finely divided pigments dispersed in a binder.

9. Dwelling according to claim 1, wherein the inner wall element of the hot enclosure have an inclination, with respect to the horizontal, higher than the inclination with respect to the horizontal of the outer covering element of the cold enclosure.

10. Dwelling according to claim 8, wherein, for a latitude comprised between 40° and 50°, the inclination of the inner wall element of the hot enclosure is about 45° and the inclination of the outer covering element of the cold enclosure is less than 30°.

11. Dwelling according to claim 1, wherein at least one of the inner wall element of the hot enclosure and the inner wall element of the cold enclosure is thermally insulated from the dwelling.

12. Dwelling according to claim 1 wherein the outer covering element is transparent.

13. Dwelling according to claim 1 wherein the outer covering element is not transparent.

* * * * *